Figure 1:
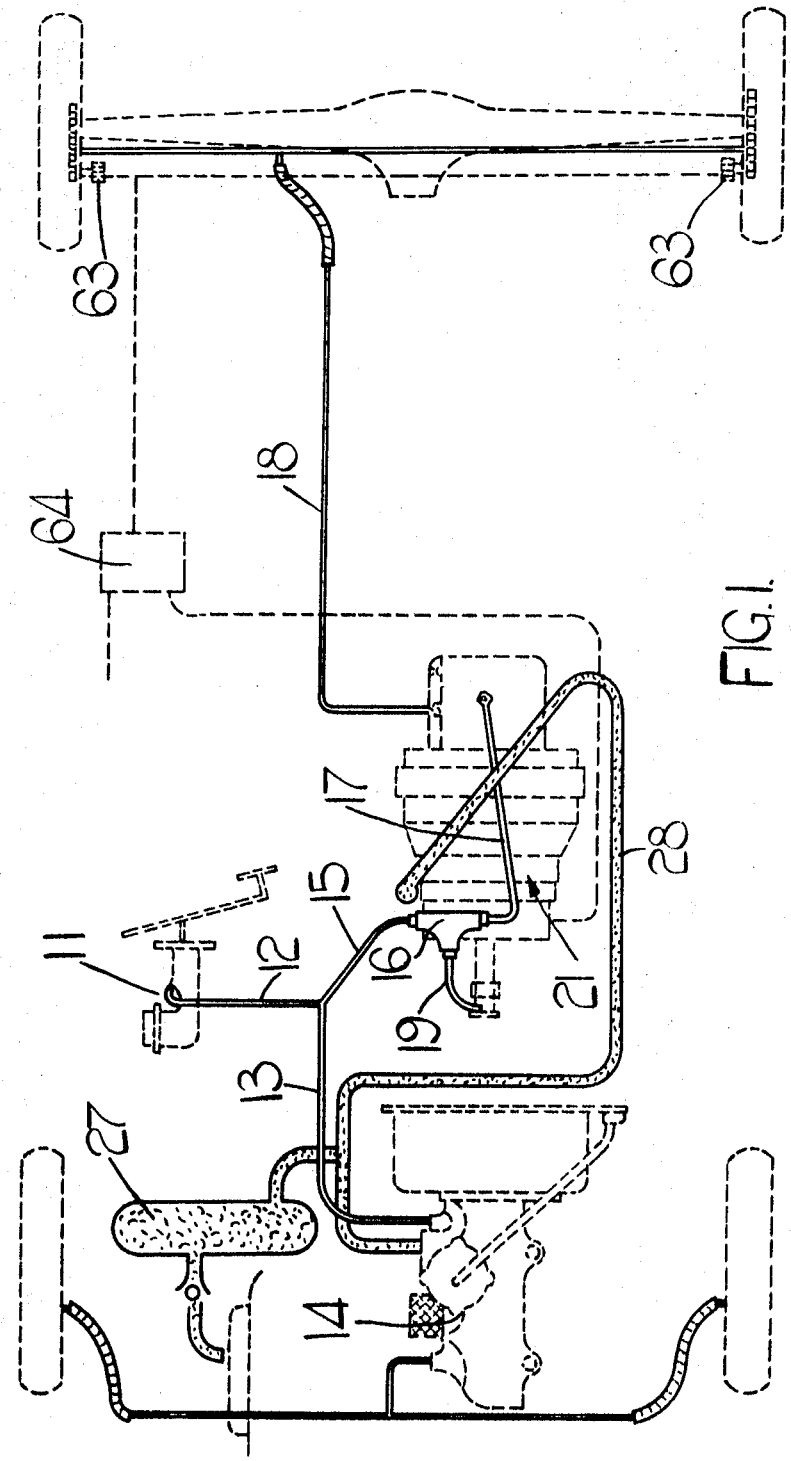

United States Patent

[11] 3,589,775

[72] Inventor Stuart B. Dawson
    Shirley, Solihull, England
[21] Appl. No. 824,134
[22] Filed May 13, 1969
[45] Patented June 29, 1971
[73] Assignee Girling Limited
    Birmingham, England
[32] Priority May 22, 1968
[33] Great Britain
[31] 24,403/68

[54] BRAKING SYSTEMS FOR VEHICLES
    6 Claims, 6 Drawing Figs.
[52] U.S. Cl. .................................................. 303/21,
    188/181, 303/6
[51] Int. Cl. .................................................. B60t 8/08,
    B60t 13/60
[50] Field of Search .................................... 303/21, 6,
    68—69, 61—63; 188/181

[56] References Cited
    UNITED STATES PATENTS
    3,481,653 12/1969 Grancon ..................... 303/21
    3,503,655 3/1970 Heimler ..................... 303/21

Primary Examiner—Milton Buchler
Assistant Examiner—John J. McLaughlin
Attorney—Holman & Stern ABSTRACT: A braking system for a vehicle includes a manually operable device for supplying hydraulic fluid under pressure. The device is connected by an hydraulic line to brake mechanisms of the vehicle so that operation of the device causes operation of the brake mechanisms. There is provided a vacuum operable servomechanism which is capable of supplying hydraulic fluid under pressure to the brake mechanisms and pressure-sensitive means operable when the pressure generated by the manually operable device exceeds a first predetermined value for braking the hydraulic line from the device and initiating operation of the servomechanism. The system further includes control means associated with the servomechanism and the manually operable device for controlling operation of the servomechanism in accordance with operation of the manually operable device, and further means responsive to the pressure in the vacuum supply line of the servomechanism for reestablishing the hydraulic line from the manually operable device to the brake mechanisms when the pressure in the vacuum line exceeds a second predetermined value, for example in the event of failure of the vacuum source.

BRAKING SYSTEMS FOR VEHICLES

This invention relates to braking systems for vehicles.

Figure 2:
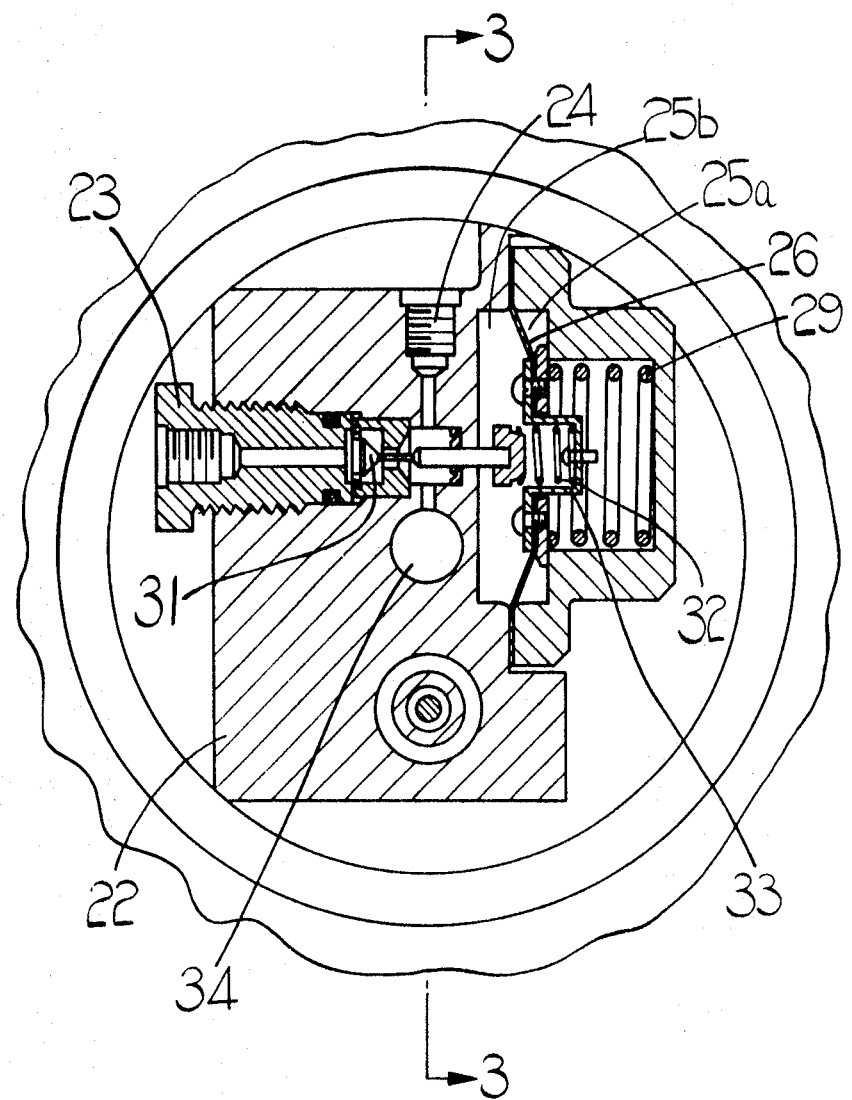
Figure 3:
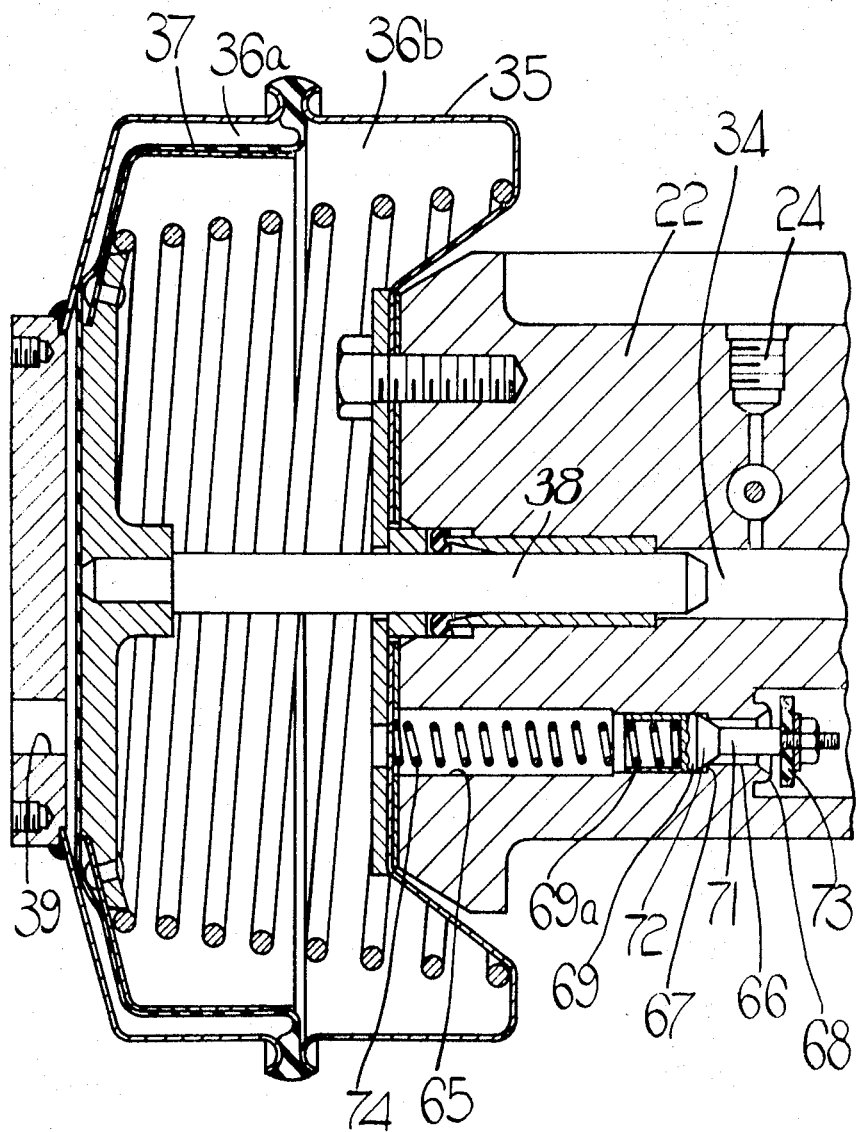
Figure 4:
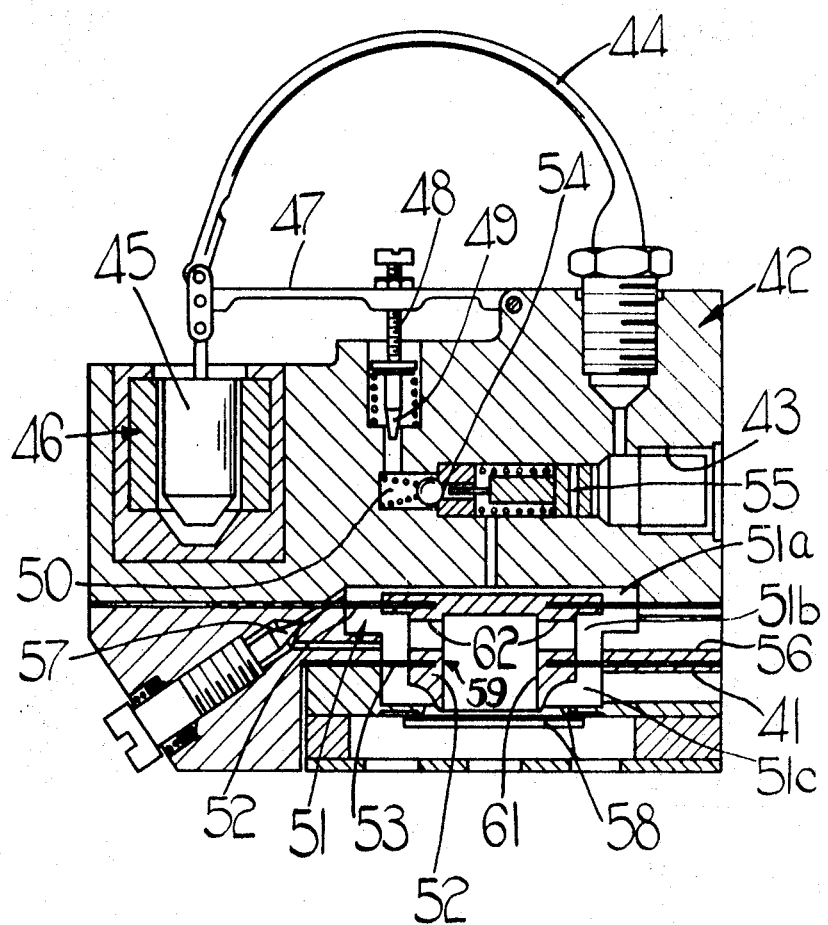
Figure 5:
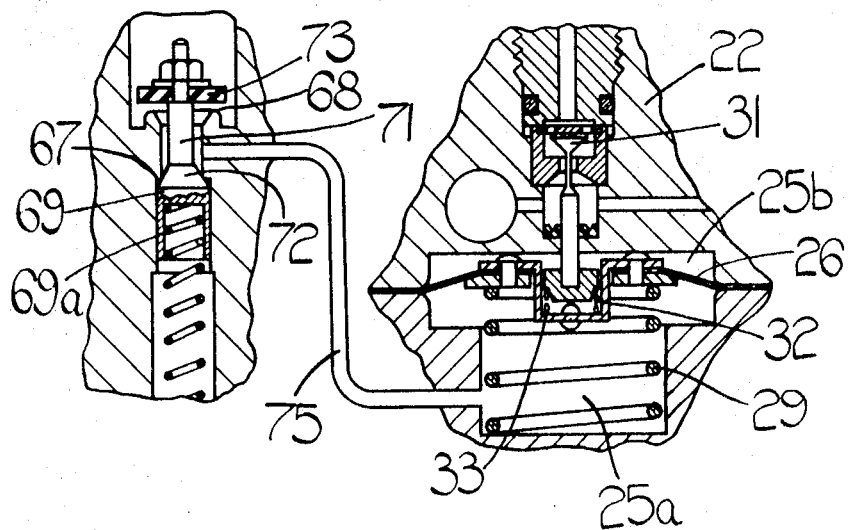
Figure 6:
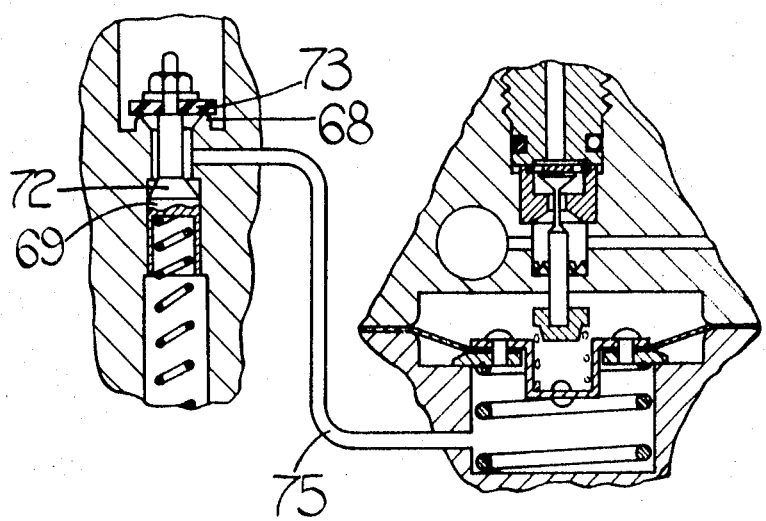

A system according to the invention includes a manually operable device for supplying hydraulic fluid under pressure, an hydraulic line connecting said device to brake mechanism of the vehicle so that operation of said device causes operation of said brake mechanisms, a vacuum operated servomechanism capable of supplying hydraulic fluid under pressure to said brake mechanisms, pressure-sensitive means, operable when the pressure generated by said device exceeds a first predetermined value, for breaking said hydraulic line from said device and initiating operation of said servomechanism, control means associated with said servomechanism and said device for controlling operation of said servomechanism in accordance with operation of said device, and further means responsive to the pressure in the vacuum supply line of the servomechanism for reestablishing said hydraulic line from said device to said brake mechanisms when the pressure in said vacuum supply line exceeds a second predetermined value, for example in the event of failure of the vacuum source. In the accompanying drawings:

FIG. 1 is a schematic illustration of a vehicle equipped with a braking system according to one example of the invention, FIG. 2 is a sectional view of part of the control of the braking system shown in FIG. 1, FIG. 3 is a sectional view on the line 3–3 in Fig. 2, FIG. 4 is a sectional view of the vacuum control of the system, and FIGS. 5 and 6 are views illustrating the operation of a safety facility of the system which ensures that the brakes of the vehicle can be applied even if the vacuum supply to the system fails.

Referring first to Fig. 1, the system includes a conventional brake pedal and master cylinder arrangement 11, which, when the brake pedal is depressed, supplies hydraulic fluid through a line 12. The line 12 is connected through a line 13 to a conventional servo assistance unit 14 controlling the front wheel brakes of the vehicle. The line 12 is connected through a line 15 to a T-junction 16, and extending from the T junction 16 is an hydraulic line 17 which is initially connected directly to the rear wheel brakes through an hydraulic line 18. Moreover a further hydraulic line 19 interconnects the T-junction 16 and the rear wheel brake control unit 21.

Referring now also to Fig. 2, the control unit 21 includes a valve body 22 having an inlet 23 connected to the line 17, and an outlet 24 connected to the line 18. The body 22 further includes a chamber 25 which is divided into subchambers 25a, 25b, by a diaphragm 26. The subchamber 25b is vented to atmosphere, and the subchamber 25a is connected to a vacuum reservoir 27 through a main vacuum supply line 28 (Fig. 1), and a safety arrangement to be described later. The diaphragm 26 is urged to the left as shown in Fig. 2 by a spring 29, but is normally held in the position shown in Fig. 2 by the pressure difference between the subchambers 25a, 25b. The inlet 23, and the outlet 24, are interconnected through a valve 31 which is urged to its open condition as shown in Fig. 2, by a spring 32 acting against a metal cup 33 carried by the diaphragm 26. The outlet 24 is further connected to a main hydraulic pressure gallery 34.

At one end, the body 22 includes a servomechanism including a casing 35 (Fig. 3) defining a chamber 36 which is divided into subchambers 36a, 36b by a diaphragm 37. The diaphragm 37 carries a piston 38 which is slidably mounted in the main hydraulic pressure gallery 34, so that movement of the diaphragm 37 to the right as shown in Fig. 3, causes hydraulic fluid to be pumped from the gallery 34 through the outlet 24 to the rear brakes. The subchamber 36b is connected directly to the vacuum reservoir 27, and the subchamber 36a is connected through a passage 39 to the outlet 41 of the vacuum control shown in Fig. 4.

Referring to Fig. 4, the vacuum control comprises a main body 42 having an inlet 43 which is connected through the lines 19, 15 and 12 to the master cylinder 11. Supported on the body 42, and connected to the inlet 43 is a Bourdon tube 44, which at its free end is pivotally connected to the plunger, 45 of a solenoid 46. The free end of the Bourdon tube 44 is further pivotally connected to one end of a rigid link 47 which at its other end is pivotally mounted on the body 42. The link 47 carries an adjustable push rod 48 which acts on a variable bleed valve 49 connecting a chamber 50, within the body 42, to atmosphere. The body 42 further defines a chamber 51, which is divided into three subchambers 51a, 51b, 51c by a pair of diaphragms 52, 53 respectively. The subchamber 51a is connected to the chamber 50 through a normally closed valve 54, the valve 54 being opened in response to operation of the brake pedal, by means of a plunger 55, one side of which receives pressure from the inlet 43. The subchamber 51b is connected through a passage 56 to the vacuum reservoir 27, and is connected through a preset restrictor 57 to the subchamber 51a. The subchamber 51c is connected to the vacuum control outlet 41, and can be connected to atmosphere through a normally closed valve 58 which is operable in response to downward movement of a plunger 59 carried by the diaphragms 52, 53. The plunger 59 is formed with a central bore 61, and a plurality of radial bores 62 which open from the bore 61 into the subchamber 51b. Thus, when the plunger 59 is disengaged from the movable member of the valve 58, then the subchamber 51b is connected to the subchamber 51c through the bores 62 and the central bore 61.

The basic operation of the system is as follows: the valve 31 is set to close when the pressure in the inlet 23 exceeds 100 p.s.i., and the valve 54 in the vacuum control is set to open when the hydraulic pressure in the inlet 43 exceeds 100 p.s.i. Thus, when the brake pedal is initially depressed, and the pressure generated is below 100 p.s.i., the rear wheel brakes are operated purely by the action of the master cylinder, through the lines 12,15,17 and 18. However 100 p.s.i. is a very low pressure for a braking system, and is rapidly exceeded. When the valve 31 closes the connection between the line 17 and the line 18 is broken, and the vacuum control (Fig. 4) is rendered operative by opening of the valve 54. The pressure generated by the master cylinder 11, is supplied through the line 19 and the inlet 43 to the Bourdon tube 44, and thus the Bourdon tube 44 tends to straighten, the degree of movement of the free end of the Bourdon tube 44 being proportional to the pressure generated by the master cylinder 11. Initially when a low pressure is applied by the master cylinder 11 the Bourdon tube 44 straightens slightly and opens the restrictor 49 a small amount to allow air to flow through the chamber 50 into a subchamber 51 a. As the restrictor valve 57 allows a small flow of air from chamber 51a to chamber 51b, no significant pressure difference is set up between the subchambers 51a and 51b and the plunger 59 remains as shown in Fig. 4. When a larger pressure is applied by the cylinder 11 the valve 49 is opened further by further straightening of the Bourdon tube 44 and a larger flow of air passes into the subchamber 51a which then has a higher internal pressure than the chamber 51b due to the restriction of flow at the valve 57. The plunger 59 is thus moved into contact with the movable member of the valve 58 thereby breaking the connection between the vacuum supply passage 56 and the servocontrol outlet 41 and opening the valve 58 so allowing air from the atmosphere to pass through the valve 58 into the subchamber 51c and into the servocontrol port 41 leading to the subchamber 36a of the servocontrol mechanism to operate the servomechanism. When the pressure difference between the subchambers 51c and 51b becomes sufficient to balance the pressure difference between the subchambers 51a and 51b the plunger 59 is returned to a position wherein the valve 58 closes, but is not returned sufficiently far to reestablish communication between the subchambers 51b and 51c. The plunger 59 is then in a balanced position with the outlet pressure of the servomechanism dependent on the pressure applied by the master cylinder 11, a further increase in the pressure applied by the cylinder 11 resetting the balance to give a greater servomechanism outlet pressure. When the pressure applied by the cylinder 11 is reduced the valve 49 is moved towards its closed position and the pressure difference between the subchambers 51a and 51b becomes less than that between the subchambers 51b and 51c and the plunger 59 is returned so as to reestablish the connection between the chambers 51b and 51c thereby connecting the vacuum passage 56 to the outlet 41 so that the pressure gradient across the diaphragm 37 of the servomechanism and therefore the output pressure of the servomechanism is reduced. The pressure difference between the subchambers 51b and 51c then becomes smaller until the balance condition wherein the plunger 59 reengages the movable member of the valve 58 is again reached. Complete removal of the pressure applied to the Bourdon tube 44 by the master cylinder 11 causes the plunger to return to the position shown in Fig. 4 with consequential cessation of the operation of the servomechanism.

The system so far described is merely a servosystem for increasing the pressure applied to the rear wheel brakes over that generated by the master cylinder, and as yet described there is no provision for preventing locking of the rear wheels of the vehicle. Each rear wheel of the vehicle drives a respective generator 63 which produces an output dependent on the angular velocity of its respective wheel. The outputs of the generators are supplied to a control circuit where they are applied across a pair of capacitors which differentiate the outputs from the generators and so the signals derived from the capacitors represent deceleration of the wheels. The signal representing the greatest deceleration is supplied through a control amplifier 64 to the coil of the solenoid 46. Thus the solenoid 46 is energized to an extent dependent on the deceleration of the rear wheels of the vehicle, the greater the deceleration of the rear wheels, the greater the energization of the solenoid 46. Energization of the solenoid 46 causes the plunger 45 of the solenoid to be drawn inwardly, that is to say downwardly in Fig. 4 against the action of the Bourdon tube 44. It will be appreciated then that as the pressure applied to the brakes increases, the deceleration of the rear wheels increases, and so the resistance to straightening of the Bourdon tube, applied by the solenoid 46, increases so that the opening of the variable restrictor 49 is decreased, thereby reducing the braking force applied by the servomechanism. Thus the braking force applied by the brake system to the rear wheels of the vehicle is modulated, and the system is set up so that locking of the rear wheels cannot occur. In a modification the system is designed so that the solenoid 46 is not energized until the wheels actually lock, whereupon energization of the solenoid 46 closes the variable restrictor 49, through the link 47 to immediately release the brakes.

The braking system includes a safety facility whereby the rear wheel brakes will be operated directly from the master cylinder 11, should the vacuum supply in the reservoir 27 fail.

Referring to FIGS. 5 and 6, in addition to the remainder of the drawings, the safety facility is as follows: the body 22 is provided with a bore 65 which communicates at one end with the vacuum reservoir 27, through the subchamber 36b of the servomechanism. Adjacent its end remote from the subchamber 36b, the passage 65 is formed with a portion 66 of reduced diameter, and a shoulder 67 is defined between the main part, and the portion 66 of the bore 65. The shoulder 67 defines a first valve seat, and at the end of the portion 66 of the bore 65 remote from the subchamber 36b there is defined a second valve seat 68, the end of the portion 66 of the bore 65 being bevelled. Loosely mounted in the bore 65, is a valve member 69 including a first part 69a the diameter of which is slightly less than the diameter of the bore 65 and greater than the diameter of the portion 66 of the bore 65, and a second part 71 the diameter of which is less than the diameter of the portion 66 of the bore 65. The parts 69a and 71 of the valve member 69 are interconnected by a frustoconical portion 72, and at its free end the part 71 of the valve member 69 carries a sealing disc 73. The valve member 69 is urged by a spring 74 to a position wherein the frustoconical portion 72 of the valve member 69 engages the shoulder 67 in the bore 65, to seal the bore 65. The dimensions of the bore 65 and the valve member 69 are such that when the frustoconical portion 72 of the valve member is engaged with the shoulder 67, then the sealing disc 73 is spaced from the valve seat 68. A passage 75 (FIGS. 5 and 6) communicate at one end with the portion 66 of the bore 65 and communicate at its other end with the subchamber 25a of the chamber 25 in the valve body 22. Normally there is an adequate vacuum supply in the reservoir 27, and the valve member 69 is in the position shown in Fig. 6, wherein the sealing disc 73 is engaged with the valve seat 68 to close the extreme end of the bore 65. The frustoconical portion 72 of the valve member 69 is apaced from the shoulder 67, and since the portion 69a of the valve member 69 is a loose fit in the bore 65, then the subchamber 25a is subject to the vacuum in the reservoir 27 through the passage 75, the bore 65, and the subchamber 36b. Thus the diaphragm 26 is held in the position shown in Fig. 2, against the action of the spring 29, and the valve 31 can be closed against the action of the spring 32 when the pressure generated by the master cylinder exceeds 100 p.s.i. However should the vacuum level in the reservoir 27 fall below 10 inches of mercury then the valve 69 will move under the action of the spring 74 to break the seal between the valve seat 68 and the sealing disc 73. The diameter of the valve seat 68, by virtue of the bevel at the free end of the portion 66 of the bore 65, is of greater diameter than the diameter of the portion 66 of the bore 65, and so as soon as the seal is broken between the valve seat 68 and the sealing disc 73, then atmospheric pressure is acting over the small diameter of the portion 72 of the valve member 69, rather than over the larger area of the sealing disc 73, and so the pressure difference across the valve member 69 is reduced and the valve member is moved rapidly under the action of the spring 74 to the position shown in Fig. 5, wherein the portion 72 of the valve member 69 engages the shoulder 67 and seals the bore 65. Since the sealing disc 73 is not now engaged with the valve seat 68, then the subchamber 25a is opened to atmosphere through the passage 75, and the diaphragm 26 is moved under the action of the spring 29 to the position shown in FIG. 5, thereby forcing the valve 31 open against the pressure generated by the master cylinder 11. The spring 29 holds the valve 31 open, so that the master cylinder 11 is connected directly to the rear wheel brakes irrespective of the pressure generated by the master cylinder 11 so that efficient braking can be obtained even though the vacuum supply has failed. As the vacuum level in the reservoir 27 rises once again to a safe level the pressure difference between the portion 66 of the bore 65 and the main portion of the bore 65 becomes sufficient to move the valve member 69 against the action of the spring 74. When the portion 72 of the valve member 69 moves out of engagement with the shoulder 67, then atmospheric pressure can act over the whole area of the portion 72, and so the pressure difference increases still further, and the member 69 is rapidly moved back to the position shown in Fig. 6 thereby reestablishing the vacuum supply to the subchamber 25a so that the diaphragm 26 is moved to allow the valve 31 to be closed when the pressure generated by the master cylinder 11 exceeds 100 p.s.i.

Having thus described my invention what I claim as new and desire to secure by Letters Patent is:

1. A braking system for a vehicle including a manually operable device for supplying hydraulic fluid under pressure, an hydraulic line connecting said device to brake mechanisms of the vehicle so that operation of said device causes operation of said brake mechanisms, a vacuum operated servomechanism including a diaphragm both sides of which are subject to vacuum in the inoperative position of the mechanism and capable of supplying hydraulic fluid under pressure to said brake mechanisms, pressure-sensitive means operable when the pressure generated by said device exceeds a first predetermined value, for braking said hydraulic line from said device and initiating operation of said servomechanism, control means associated with said servomechanism and said device for controlling operation of said servomechanism in accordance with operation of said device, said control means including a Bourdon tube which receives fluid under pressure from said device and an air bleed valve operable by the Bourdon tube to supply air to one side of said diaphragm, said Bourdon tube being straightened as the pressure generated by said device increases, thereby progressively opening said bleed valve and increasing the pressure difference across said diaphragm so as to increase the pressure applied by said servomechanism, and further means responsive to the pressure in the vacuum supply line of the servomechanism for reestablishing said hydraulic line from said device to said brake mechanisms when the pressure in said vacuum supply line exceeds a second predetermined value, for example in the event of failure of the vacuum source.

2. A system as claimed in claim 1 wherein said pressure sensitive means includes a valve in said line, said valve closing when the pressure in said line exceeds said first predetermined value, and said further means includes a plunger one side of which is subject to atmospheric pressure and the other side of which is subject to the vacuum in said vacuum supply line, said plunger being resiliently urged towards a position wherein it holds said valve open but being held in a retracted position while the pressure in said vacuum supply line is below said second predetermined value and said plunger being moved when the pressure in said vacuum supply line exceeds said second predetermined value to open said valve.

3. A system as claimed in claim 2 wherein said one side of said plunger is subject to the vacuum in said vacuum supply line through a further valve, said further valve having a first position which it occupies when the pressure in said vacuum supply line is below said second predetermined value, and in which it connects said one side of said plunger to said vacuum supply line, and a second position to which it is moved when the pressure in said vacuum supply line rises above said second predetermined value and which it connects said one side of said plunger to atmosphere.

4. A system as claimed in claim 3, wherein said further valve includes a movable spool one side of which is subject to atmospheric pressure and the other side of which is subject to the vacuum in the vacuum supply line, said valve being such that initial movement of the spool in one direction alters the surfaces of the spool upon which pressure acts in such a manner that the pressure difference across the spool aids the movement of the spool in said one direction so that the valve has a rapid action.

5. A system as claimed in claim 1, wherein there is provided apparatus for producing a signal dependent upon deceleration of at least one of the wheels of the vehicle with which said brake mechanisms are utilized, said signal being used to control the operation of said brake mechanisms by said servomechanism to minimize locking of said wheels.

6. A system as claimed in claim 5, wherein said signal is used to control operation of a solenoid in a manner to oppose straightening of said Bourdon tube.